United States Patent
Inatomi

(10) Patent No.: US 9,533,559 B2
(45) Date of Patent: Jan. 3, 2017

(54) RESIN TORQUE ROD

(71) Applicant: YAMASHITA RUBBER KABUSHIKI KAISHA, Fujimino-shi, Saitama (JP)

(72) Inventor: Takatoshi Inatomi, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/904,517

(22) PCT Filed: Aug. 13, 2014

(86) PCT No.: PCT/JP2014/071413
§ 371 (c)(1),
(2) Date: Jan. 12, 2016

(87) PCT Pub. No.: WO2015/022983
PCT Pub. Date: Feb. 19, 2015

(65) Prior Publication Data
US 2016/0152127 A1 Jun. 2, 2016

(30) Foreign Application Priority Data

Aug. 14, 2013 (JP) ................. 2013-168739

(51) Int. Cl.
*F16M 1/00* (2006.01)
*B60K 5/12* (2006.01)
(Continued)

(52) U.S. Cl.
CPC ............. *B60K 5/1241* (2013.01); *F16F 1/38* (2013.01); *F16F 15/02* (2013.01); *F16F 15/08* (2013.01)

(58) Field of Classification Search
CPC .... B60K 5/1241; B60K 5/1275; F16F 1/3849; F16F 15/02; F16K 1/38
See application file for complete search history.

(56) References Cited

U.S. PATENT DOCUMENTS

| 8,430,382 B2 * | 4/2013 | Kashihara | B60K 5/1241 |
| | | | 267/140.12 |
| 2005/0212188 A1 * | 9/2005 | Endo | F16F 1/3849 |
| | | | 267/141.2 |
| 2005/0254888 A1 * | 11/2005 | Oji | F16F 1/3849 |
| | | | 403/187 |

FOREIGN PATENT DOCUMENTS

| JP | 2009-115109 | 5/2009 |
| JP | 2010-019323 | 1/2010 |
| JP | 2010-096277 | 4/2010 |

OTHER PUBLICATIONS

International Search Report dated Oct. 7, 2014, Application No. PCT/JP2014/071413, English translation included.

* cited by examiner

*Primary Examiner* — Amy Sterling
(74) *Attorney, Agent, or Firm* — Rankin, Hill & Clark LLP

(57) ABSTRACT

To heighten the rigidity of a torque rod at the time of compression. A rod section 12, a second ring section 16 and a main body portion 18 are integrally formed of resin. The rod section 12 is provided with a pair of intermediate ribs 44 which extends in parallel in the direction of a center axis CO. A center groove 45 is formed between the intermediate ribs 44. Front end portions 44a of the intermediate ribs 44 located on a first ring section 14 side spread apart in the direction away from each other. A connecting rib 46 provided in a front end portion 45a of the center groove 45 provides a connection between the front end portions 44a. With this construction, even if a compression load is imposed on the front end portions 44a in the direction to forcibly spread these end portions apart, this is suppressed by the connecting rib 46. The connecting rib 46 is arranged (Continued)

in the vicinity of the first ring section 14 whereby effective reinforcement can be achieved.

9 Claims, 7 Drawing Sheets

(51) Int. Cl.
*F16F 15/08* (2006.01)
*F16F 1/38* (2006.01)
*F16F 15/02* (2006.01)

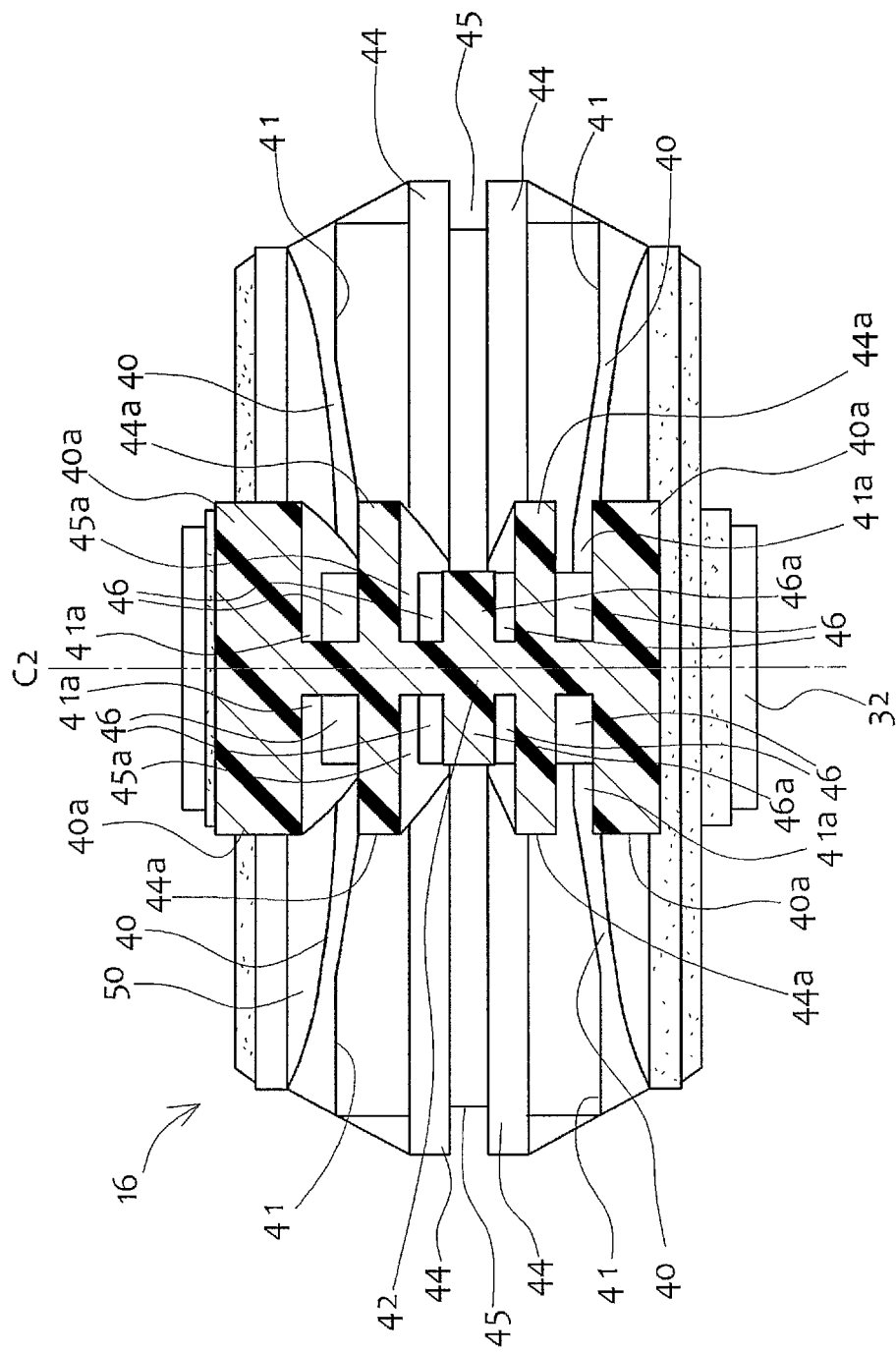

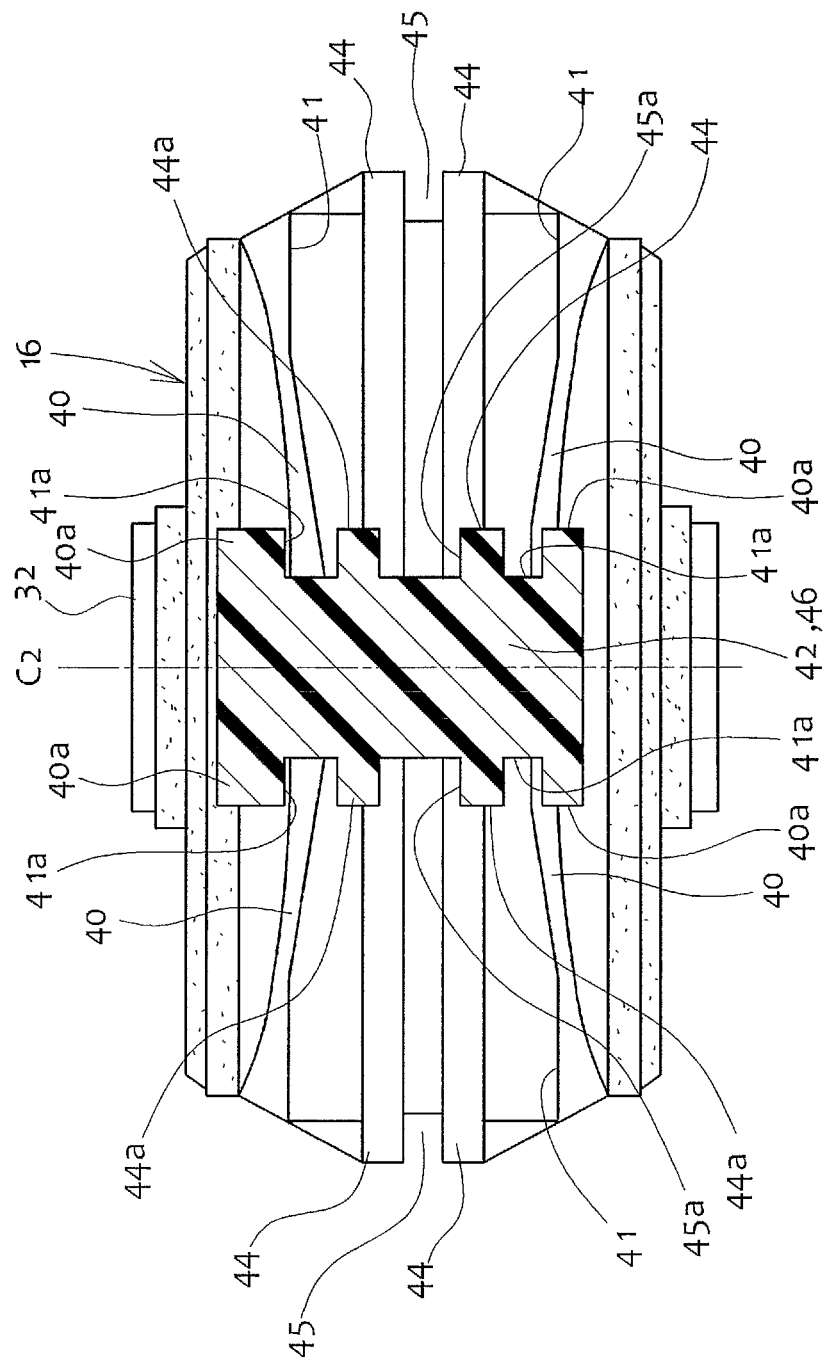

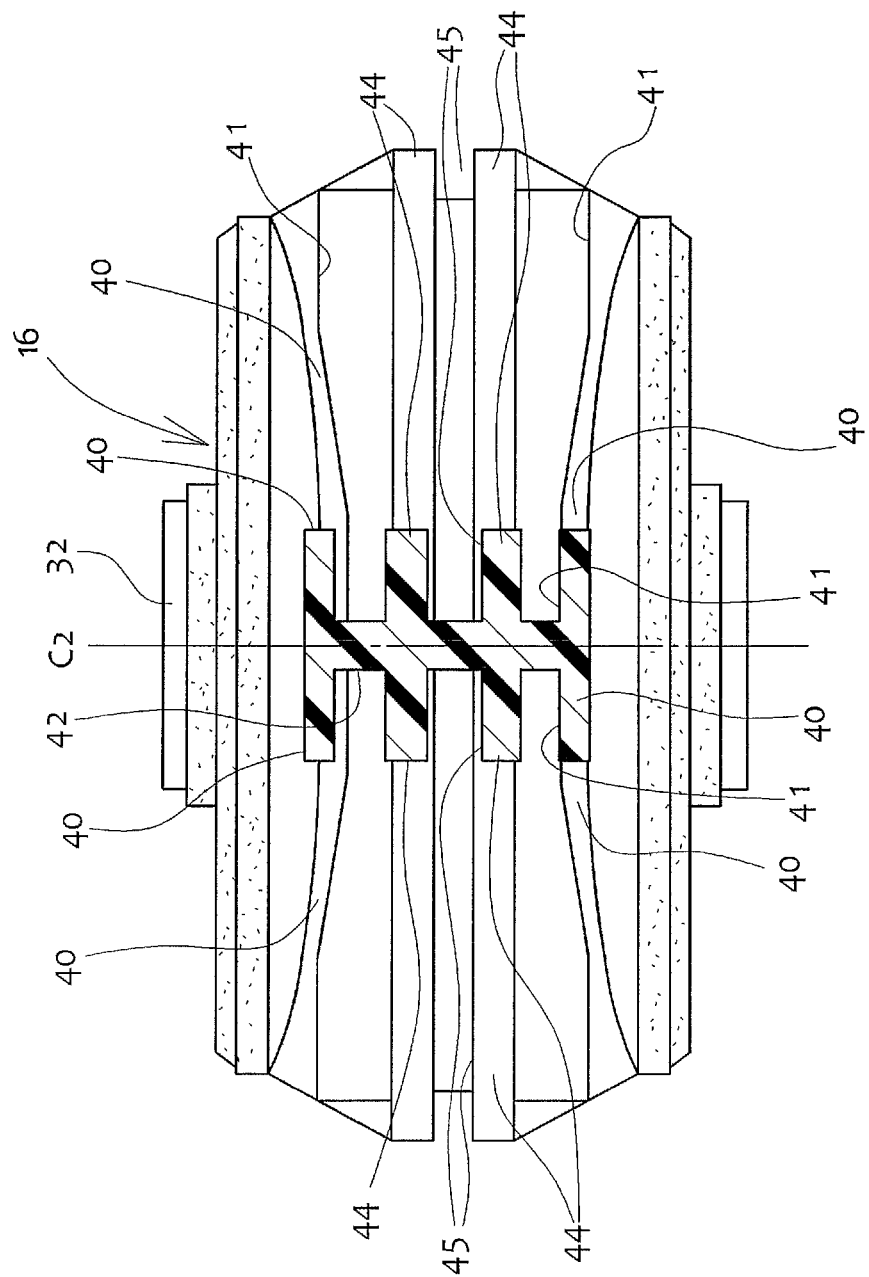

RESIN TORQUE ROD

TECHNICAL FIELD

The present invention relates to a resin torque rod and, more particularly, to the torque rod provided with a plurality of ribs.

BACKGROUND ART

A torque rod as a vibration isolating device to be used at the time of mounting an engine on a vehicle body is publicly known. In addition, the torque rod made of resin is also publicly known. When the resin torque rod is provided with a plurality of ribs, it is possible to obtain a decrease in weight and an increase in rigidity (see a patent reference 1, for instance). Moreover, there is the torque rod of the type that has a curved or bent rib (see a patent reference 2, for instance).

PRIOR ART REFERENCE

Patent reference 1: Japanese Patent Application Laid-open Publication No. 2010-019323.
Patent reference 2: Japanese Patent No. 5,095,577.

DISCLOSURE OF THE INVENTION

Problem to be Solved by the Invention

By the way, in the case where a pair of lateral ribs which extends in the longitudinal direction of a rod section is provided in the rod section so as to increase the rigidity and each end portion in the longitudinal direction of these lateral ribs is arranged in the vicinity of a ring section, there is a possibility that end portions of the pair of lateral ribs each are deformed in such a way as to be laterally spread apart when a load is imposed in the direction of compression of the rod section. At that time, the rigidity at the time of compression is decreased. Therefore, it is required to increase the rigidity at the time of the compression. The present invention aims at realizing the above referred requirements.

Means for Solving the Problem

To solve the above described problems, a resin torque rod according to a first feature of the present invention comprises ring sections integrally formed in both ends in a longitudinal direction of a rod section (12), and a pair of lateral ribs (44) provided in the rod section (12) and extending in the direction of a center axis (C0) in a parallel relationship, wherein respective one ends in the longitudinal direction of the lateral ribs (44) are located in the vicinity of the ring section (14), and a connecting rib (46) which provides a connection between respective one end portions (44a) in the longitudinal direction of the pair of lateral ribs (44) is integrally provided in the rod section (12).

According to a second feature of the present invention, in addition to the first feature, the one end portions (44a) in the longitudinal direction of the pair of lateral ribs (44) spread apart in the direction away from each other, and the connecting rib (46) provides a connection between these spreading one end portions.

According to a third feature of the present invention, in addition to the second feature, a center groove (45) is formed in the shape of a groove between the pair of lateral ribs (44), and the connecting rib (46) is formed in an end portion (45a) in the longitudinal direction of the center groove (45).

According to a fourth feature of the present invention, in addition to the third feature, a projecting height of the connecting rib (46) is smaller than those of the one end portions (44a) in the longitudinal direction of the lateral ribs (44).

According to a fifth feature of the present invention, in addition to the fourth feature, the connecting rib (46) is located on the center axis (C0).

Effects of the Invention

According to the first feature of the present invention, each one end in the longitudinal direction of the pair of the lateral ribs (44) which extends in the direction of the center axis (C0) is located in the vicinity of the ring section (14), and the one end portions (44a) in the longitudinal direction of the pair of lateral ribs (44) are connected by the connecting rib (46) With this construction, even if each of the one end portions (44a) bears a load in the direction of compression from the ring section (14), the respective one end portions (44a) are reinforced by the connecting rib (46) in such a condition as to be hardly spread apart from each other. Therefore, the rigidity at the time of compression can be increased.

Moreover, since the one end portions (44a) in the vicinity of the ring section (14) are connected by the connecting rib (46), the connecting rib (46) is configured to be located in an inputting part of the load, so that the one end portions (44a) can be efficiently reinforced against force at the time of the compression and the connecting rib (46) can be decreased in size and weight.

According to the second feature of the present invention, since the respective one end portions (44a) of the pair of lateral ribs (44) spread apart in the direction away from each other, these can be extended to a position close to a center of the ring section (14). Therefore, the rigidity against the compression with respect to the ring section (14) and the lateral ribs (44) can be heightened.

According to the third feature of the present invention, since the connecting rib (46) is formed in the one end in the longitudinal direction of the center groove (45) which is formed between the respective one end portions (44a) of the pair of lateral ribs (44), the projection of the connecting rib (46) is able to be lessened so that the connecting rib (46) can be compactified.

According to the fourth feature of the present invention, the projecting height of the connecting rib (46) is smaller than those of the lateral ribs (44), so that it can be more compactified.

According to the fifth feature of the present invention, since the connecting rib (46) is located on the center axis (C0), the connecting rib (46) can bear efficiently the compression load from the ring section (14) when the load is applied along the center axis (C0).

BRIEF DESCRIPTION OF THE DRAWINGS

FIG. 5 is a cross sectional view taken along line 5-5 of FIG. 1;

FIG. 6 is a cross sectional view take along line 6-6 of FIG. 1; and

FIG. 7 is a cross sectional view taken along line 7-7 of FIG. 1.

BEST MODE FOR CARRYING OUT THE INVENTION

Figure 1:
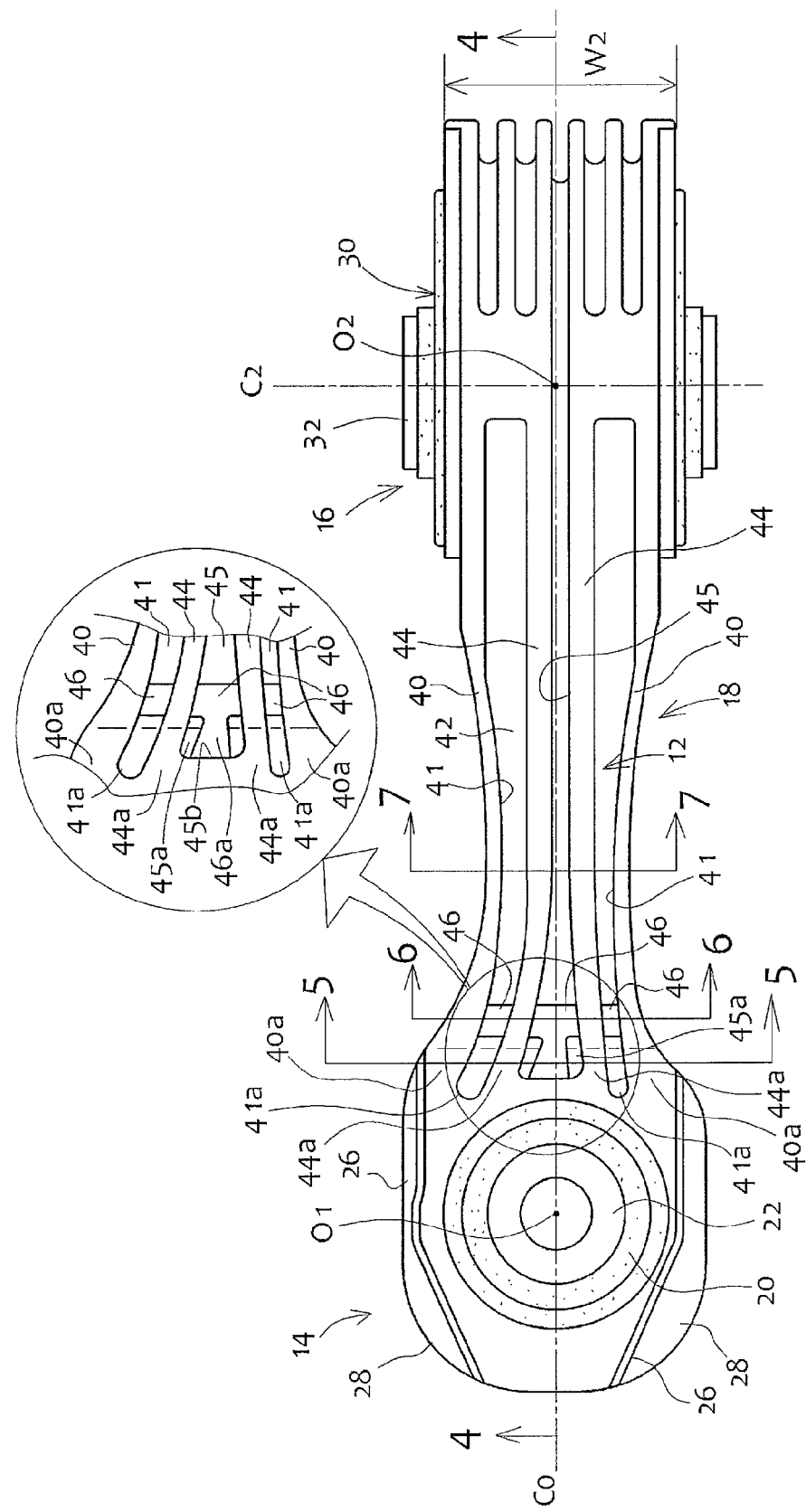
FIG. 1 is a front view of a torque rod.

Hereinafter, an embodiment of the present invention will be explained with reference to accompanying drawings.

This torque rod 10 has a main body portion 18 which is made of publicly known proper resin such as FRP, etc. and which is integrally formed with a rod section 12 of long bar shape, a first ring section 14 and a second ring section 16 provided on both sides in the longitudinal direction of the rod section 12.

Figure 3:
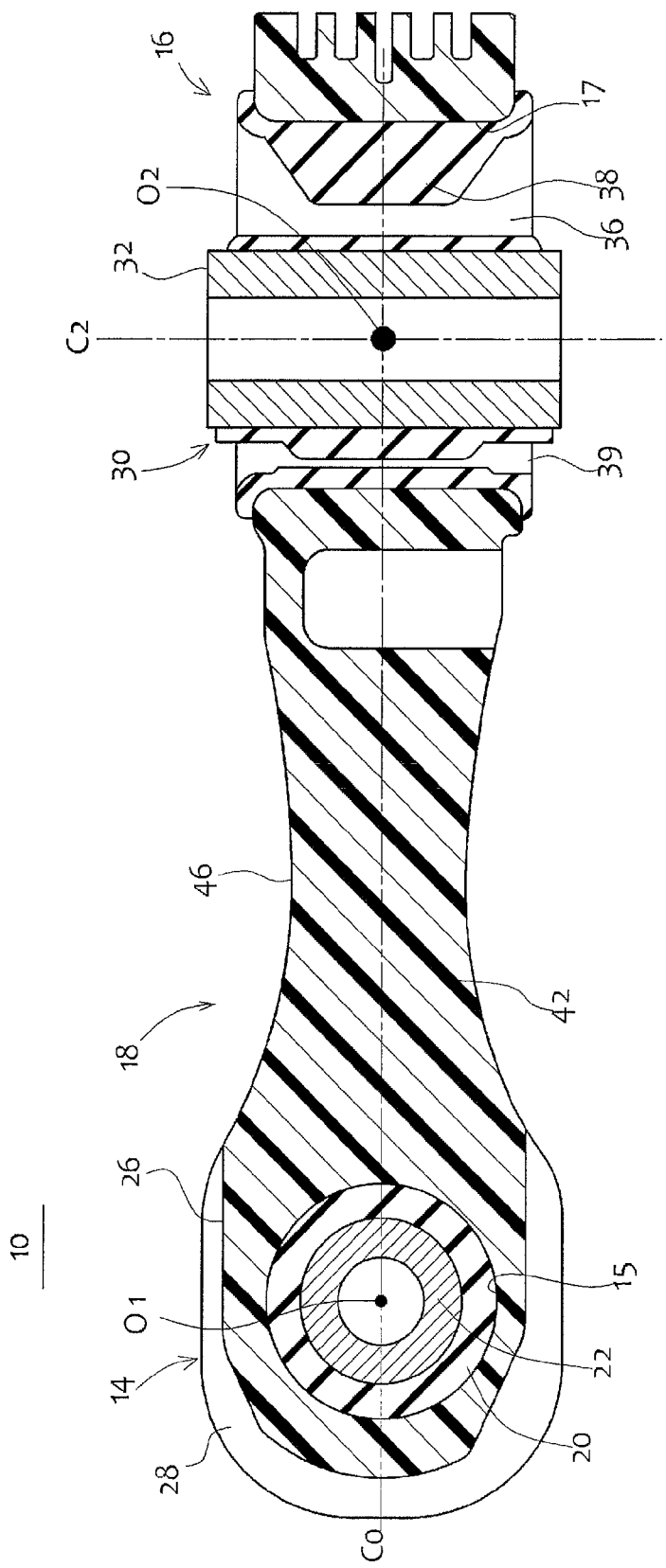
FIG. 3 is a cross sectional view taken along line 3-3 of FIG. 2.

The first ring section 14 is provided with a ring hole 15 (see FIG. 3) connected to a first inside member 22 through a first elastic body 20 which is arranged on the inside of the ring hole 15. The first elastic body 20 is made of proper elastic material such as rubber and the like and elastically connects the first ring section 14 and the first inside member 22 by means of curing adhesion and the like. The first inside member 22 is a pipe member made of metal and the like and is mounted on an engine (not shown in the drawing) by a bolt and the like (not shown in the drawing) which is inserted into the first inside member 22.

The second ring section 16 has a ring hole 17 (see FIG. 3) connected to a second inside member 32 through a second elastic body 30 which is arranged on the inside of the ring hole 17. The second elastic body 30 is made of proper elastic material such as rubber and the like and elastically connects the second ring section 16 and the second inside member 32 by means of curing adhesion and the like.

The second inside member 32 is a pipe member made of metal and the like and is mounted on a vehicle body (not shown in the drawing) by a bolt and the like (not shown in the drawing) which is inserted into the second inside member 32.

Figure 2:
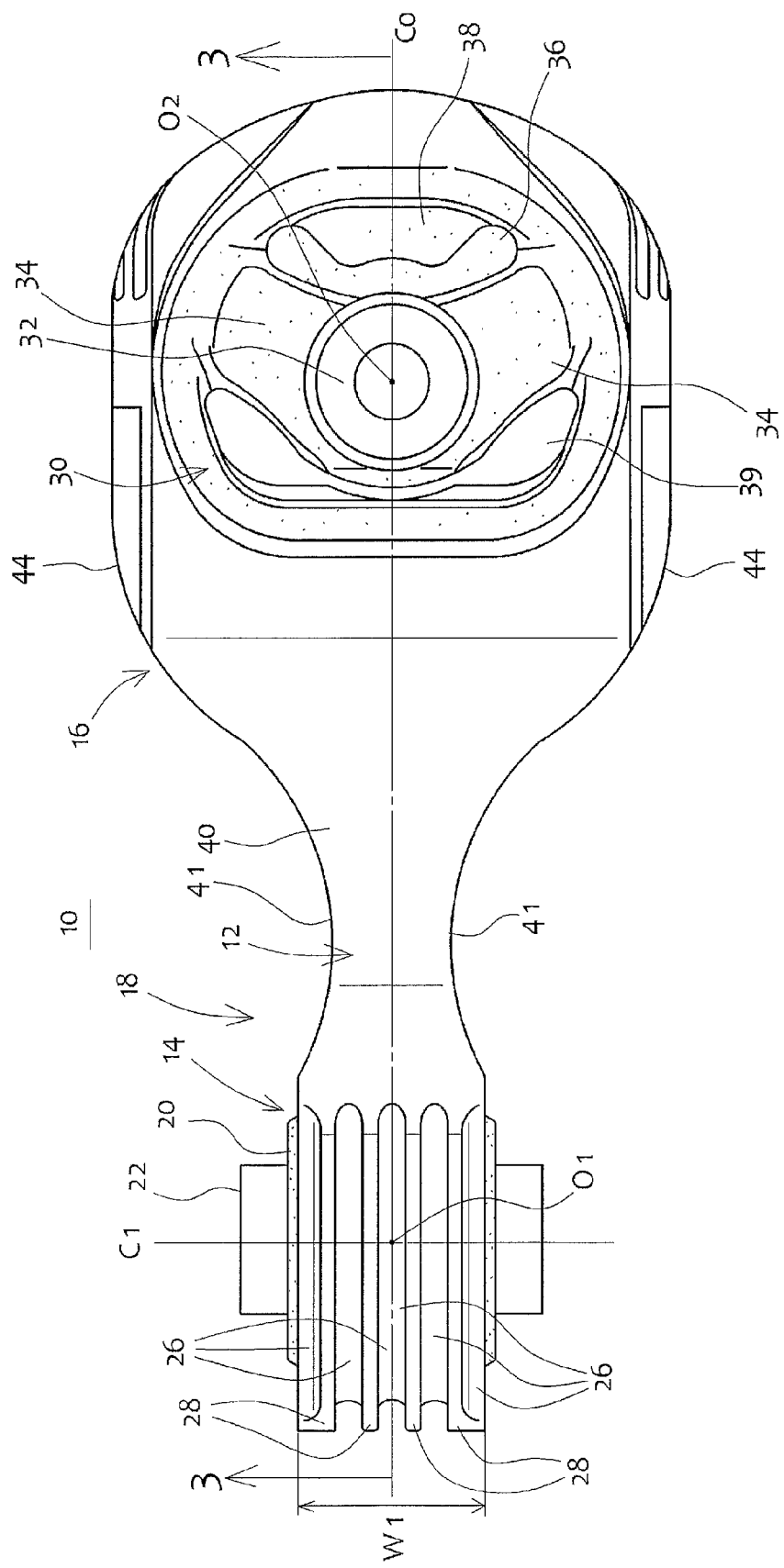
FIG. 2 is a plan view thereof.

Herein, a center of the first ring section 14 is designated by O1, a center of the second ring section 16 is designated by O2, and a straight line connecting these centers is designated as a center axis C0. In addition, a center axis of the first ring section 14 is designated by C1 and a width thereof is designated by W1 (FIG. 2). A center axis of the second ring section 16 is designated by C2 and a width thereof is designated by W2 (FIG. 1). The center axis C1 is also an axis of the first inside member 22, and the center O1 is located in the middle of the width W1 on the center axis C1. The center axis C2 is also an axis of the second inside member 32, and the center O2 is located in the middle of the width W2 on the center axis C2.

The respective center axes C1 and C2 intersect at right angles with each other and are twisted at 90° relative to each other. However, the torque rod of the present invention is not limited to such twisted type and may be of the type that has the center axes C1 and C2 which extend in parallel with each other.

The center axis C0 intersects at right angles with these center axes C1 and C2. Moreover, in this embodiment, the rod section 12 is symmetrically formed about the center axis C0 (see FIG. 2), and the center axis C0 is also a center axis of the rod section 12.

Herein, the direction of the center axis C0 shall be the forward and rearward direction, and the direction of the center axis C2 shall be the upward and downward direction. In addition, the left side of FIG. 1 shall be the forward direction, and the upper side thereof shall be the upward direction. Further, in FIG. 2, the direction of the center axis C1 shall be the left and right direction, and the right side of FIG. 2 is the right direction.

As shown in FIG. 2, the second elastic body 30 has arm sections 34 which extend left and right from the second inside member 32, and functions as a main body portion of vibration isolation.

The arm sections 34 are formed in substantially a V-shape which is convexed in the forward direction in a plan view and spreads laterally toward the rear. The second inside member 32 is opposed to a stopper 38 through a void 36 which passes through in the upward and downward direction. Also in front of the arm section 34 there is formed a void 39 which passes through in the upward and downward direction.

When the engine and the vehicle body are connected by the torque rod 10, the vibrations of the engine in the upward and downward direction and in the forward and rearward direction are inputted through the first inside member 22 to the first ring section 14 so that the first elastic body 20 is elastically deformed. At that time, the first elastic body 20 is twisted, and the torque rod 10 is rocked about the first inside member 22 as a rocking center, so that the second ring section 16 moves in the forward and rearward direction to thereby allow the arm sections 34 to be elastically deformed. Due to this operation, the vibrations are isolated by the torque rod 10 whereby to reduce the vibration transmission to the vehicle body.

Figure 4:
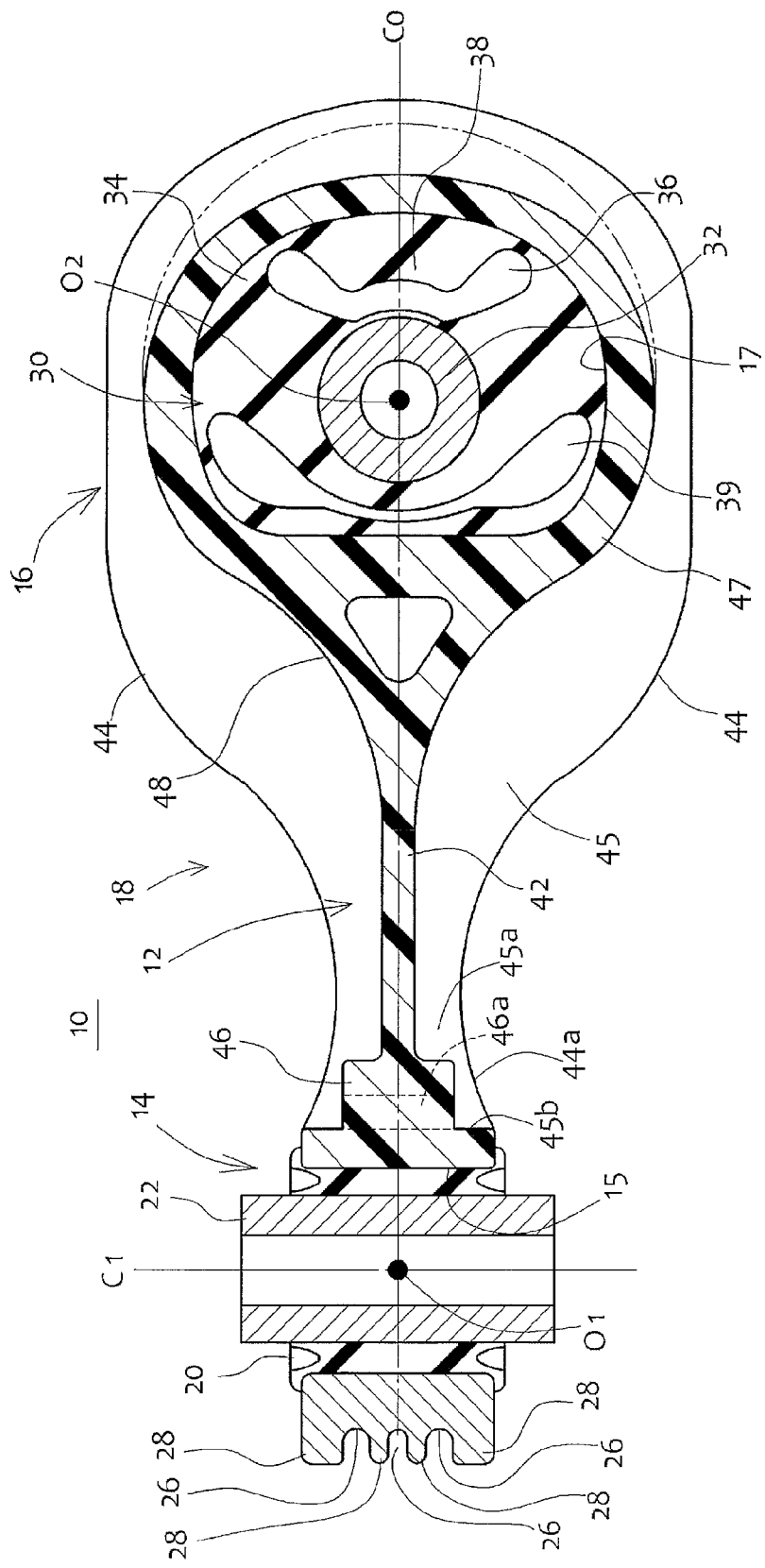
FIG. 4 is a cross sectional view taken along line 4-4 of FIG. 1.

Next, the construction of ribs will be explained. As shown in FIGS. 1, 2 and 4 as the central features, on an outer circumferential surface of the first ring section 14, there are formed a plurality of thin-walled grooves 26 which extend in parallel in the circumferential direction. Ribs 28 are formed by the remainder of the thin-walled grooves 26. The plurality of ribs 28 are formed in a parallel extending fashion.

The rod section 12 is integrally provided with upper and lower ribs 40 which project in the left and right directions from upper and lower sides thereof and with a columnar section 42 (see FIGS. 3, 4 and 7) which connects the upper and lower ribs 40 and which extends along the center axis C0 in the forward and rearward direction. In cross section, the plurality (four in this embodiment) of upper and lower ribs 40 which extend horizontally in such a way as to be parallel to each other in the upward and downward direction intersect with the single columnar section 42 which extends in the upward and downward direction (FIG. 7).

In a plan view, the upper and lower ribs 40 each are formed with curved portions 41 which are constricted toward the center in an intermediate part in the forward and rearward direction (see FIG. 2). Moreover, in a lateral surface of the columnar section 42 there are integrally formed two intermediate ribs 44 each of which projects left and right in such a way as to extend in parallel with the center axis C0 to the second ring section 16 side except a forward end portion thereof.

The intermediate ribs 44 are thicker than the upper and lower ribs 40 and formed as lateral ribs extending along the center axis C0 in the forward and rearward direction.

Between each of the intermediate ribs 44 and each of the upper and lower ribs 40 there are formed long upper and lower grooves 41 which extend along the intermediate ribs 44 in the forward and rearward direction.

Also between the pair of intermediate ribs 44 there is formed a center groove 45. The width in the upward and downward direction of the center groove 45 is narrower than the upper and lower grooves 41, and the center groove 45 is formed long in the forward and rearward direction along the center axis C0.

As shown in FIG. 1, the upper and lower ribs 40 are curved in such a condition as to become narrowest in interval in the middle in the longitudinal direction of the rod section 12. Front end portions 40a of the upper and lower ribs 40 spread apart from each other in the forward direction and are connected continuous with the ribs 28 of the first ring section 14.

Front end portions 41a of the upper and lower grooves 41 are also curved in such a condition as to be spaced apart from each other in the upward and downward directions. Front end positions of the front end portions 41a each are located above and below the first inside member 22 in the upward and downward direction. In other words, the first inside member 22 is located in such a position as to enter between front ends of the front end portions 41a.

A front end portion 45a of the center groove 45 is formed as an enlarged part which is widened in the upward and downward direction. Each of the front end portions 44a of the intermediate ribs 44 is formed in a curved fashion between the front end portion 45a and each of the front end portions 41a of the upper and lower grooves 41. The front end portions 44a of the intermediate ribs 44 are curved in such a condition as to be spaced apart from each other in the upward and downward directions.

A front end of the front end portion 45a of the center groove 45 is positioned rearwardly of each of the front end positions of the front end portions 41a of the upper and lower grooves 41 and located in the vicinity of a rear of the first inside member 22 on the center axis C0. Accordingly, when the first inside member 22 moves backwardly on the center axis C0, namely, when the load in the direction of compression is applied to the torque rod 10, the first inside member 22 acts in the direction to forcibly spread apart each of the front end portions 44a of the upper and lower intermediate ribs 44.

The front end portions 44a of the intermediate ribs 44 each are connected by connecting ribs 46. As shown in an enlarged part of FIG. 1, the connecting rib 46 extends in the upward and downward direction so as to provide a connection between the front end portions 44a of the upper and lower intermediate ribs 44. A part of the connecting rib 46 forms a projecting portion 46a which extends forwardly, and is connected to a front wall 45b of the front end portion 45a of the center groove 45. The projecting portion 46 is not connected to each of the front end portions 44a of the intermediate ribs 44 (see FIG. 5).

By the way, the connecting rib 46 is located also in the front end portions 41a of the upper and lower grooves 41, so that the connecting ribs 46 provide a connection between each of the front end portions 44a of the intermediate ribs 44 and each of the front end portions 40a of the upper and lower ribs 40 (see FIG. 6).

As shown in FIG. 4, projecting heights in the left and right directions of the connecting ribs 46 containing the projecting portion 46a are smaller than those of the front end portions 44a and located inwardly of the front end portions 41a of the upper and lower grooves 41. Herein, the projecting heights in the left and right directions are similarly applicable to the connecting ribs 46 which are provided in the front end portions 41a of the upper and lower grooves 41.

Next, the operation of this embodiment will be explained. As shown in FIG. 1, the front end portions 44a of the pair of intermediate ribs 44 which constitute the lateral ribs each are located in the vicinity of a joint portion of the first ring section 14 of the rod section 12. In addition, the front end portions 44a spread apart forwardly while being curved in such a way as to be gradually spaced apart from each other in the upward and downward directions, so that the first inside member 22 is arranged to be located between the respective front end portions 44a.

Therefore, when the load in the direction of compression is applied to the first ring section 14 of the torque rod 10, the first inside member 22 moves backwardly on the center axis C0, and the force is exerted on each of the front end portions 44a in such a way as to forcibly spread the front end portions 44a apart further in the direction away from each other.

However, as shown in FIGS. 4 to 6, the front end portions 44a of the intermediate ribs 44 are integrally connected by the connecting ribs 46. Therefore, the front end portions 44a of the intermediate ribs 44 are able to bear that force. Thus, the rigidity in the direction of compression can be heightened. In addition, since this is achieved by reinforcing each of the front end portions 44a of the intermediate ribs 44 located in the vicinity of the first inside member 22, the provision of the comparatively small connecting ribs 46 will suffice to heighten the rigidity, so that it is possible to compactify a neighboring region of the first ring section 14 whereby the increase in total weight of torque rod 10 can be suppressed.

Further, since the connecting ribs 46 are provided in the enlarged groove area of the front end portion 45a of the center groove 45, these can be easily provided by utilizing the enlarged groove area of the front end portion 45a of the center groove 45. In addition, since the projecting heights of the connecting ribs 46 in the left and right directions are smaller than those of the front end portions 44a of the intermediate ribs 44, the neighboring region of the first ring section 14 can be compactified due to this.

The present invention is not limited to the above embodiment, and various changes and modifications may be made in the invention without departing from the spirit and scope thereof. For instance, although the connecting ribs 46 are provided with respect to the first ring section 14 in the above embodiment, these connecting ribs 46 may be provided with respect to the second ring section 16.

What is claimed is:

1. A resin torque rod comprising:
   a rod section;
   ring sections integrally formed in both ends in a longitudinal direction of the rod section, and the rod section is arranged on a center axis connecting centers of both ring sections;
   a pair of lateral ribs provided in the rod section and extending in the direction on both sides of the center axis in a parallel relationship;
   wherein respective one ends in the longitudinal direction of a pair of the lateral ribs are located in the vicinity of one of the ring sections,
   and a connecting rib which provides a connection between respective one end portions in the longitudinal direction of the pair of lateral ribs is integrally provided in the rod section and wherein
   respective one ends in the longitudinal direction of a pair of lateral ribs provide a spreading portion spreading curvedly in the direction away from each other and
   the connecting rib provides a connection between these spreading end portions at the position away from one end portion in the longitudinal direction of the lateral ribs.

2. The resin torque rod according to claim 1, wherein a center groove is formed in the shape of a groove along the center axis between the pair of lateral ribs, and the connecting rib is formed in an end portion in the longitudinal direction of the center groove.

3. The resin torque rod according to claim 2, wherein a projecting height of the connecting rib is smaller than those of the one end portions in the longitudinal direction of the lateral ribs.

4. The resin torque rod according to claim 3, wherein the connecting rib is located on the center axis.

5. The resin torque rod according to claim 4, wherein the connecting rib possesses a portion spreading linearly in a rectangular direction of the center axis (CO) and connecting to one end portions in the longitudinal direction of the pair of the lateral ribs.

6. The resin torque rod according to claim 5, wherein the connecting rib projects along the center axis (CO) and possesses a projecting portion connecting to a front wall of the center groove.

7. The resin torque rod according to claim 6, wherein the projecting portion is not connected to each of the one end portions in the longitudinal direction of the pair of lateral ribs.

8. The resin torque rod according to claim 1, wherein the ring portion is a portion formed continuously as an enlarged part from the one end portion of the rod portion and provided with a ring hole, an inside member is connected to an inside of the ring hole through an elastic body and wherein
respective one end portions of the pair of lateral ribs is shaped in the vicinity of the ring portion of the rod section and spread apart while being curved in such a way as to be gradually spaced apart from each other so that is arranged to be located between the respective front end portions.

9. The resin torque rod according to claim 7, wherein the center groove is formed as an enlarged portion in which width of an end portion side is enlarged between those of the one end portions of the pair of lateral ribs and the connecting rib having the projecting portion is arranged in the enlarged part.

* * * * *